United States Patent [19]

Peters et al.

[11] Patent Number: 6,018,337

[45] Date of Patent: Jan. 25, 2000

[54] MEDIA COMPOSER INCLUDING POINTER-BASED DISPLAY OF SEQUENTIALLY STORED SAMPLES

[75] Inventors: Eric C. Peters, Carlisle; Joseph H. Rice, Arlington, both of Mass.

[73] Assignee: Avid Technology, Inc., Tewksbury, Mass.

[21] Appl. No.: 08/873,577

[22] Filed: Jun. 12, 1997

Related U.S. Application Data

[63] Continuation of application No. 08/045,646, Apr. 9, 1993, abandoned, which is a continuation-in-part of application No. 07/866,829, Apr. 10, 1992, Pat. No. 5,355,450.

[51] Int. Cl.⁷ .................................................. G09G 5/00
[52] U.S. Cl. ............................................. 345/328; 386/4
[58] Field of Search .................................. 345/326–328, 345/156, 157, 163; 386/4–8, 46, 52, 68

[56] References Cited

U.S. PATENT DOCUMENTS

| | | | |
|---|---|---|---|
| 3,721,757 | 3/1973 | Ettlinger | 386/61 |
| 3,740,463 | 6/1973 | Youngstrom et al. | 386/54 |
| 4,040,098 | 8/1977 | Beeson et al. | 386/54 |
| 4,100,607 | 7/1978 | Skinner | 386/59 |
| 4,195,317 | 3/1980 | Stratton | 386/69 |
| 4,205,346 | 5/1980 | Ross | 348/584 |
| 4,272,790 | 6/1981 | Bates | 386/52 |
| 4,538,188 | 8/1985 | Barker et al. | 386/54 |
| 4,612,569 | 9/1986 | Ichinose | 348/588 |
| 4,670,743 | 6/1987 | Zemke | 345/157 |
| 4,685,003 | 8/1987 | Westland | 386/52 |
| 4,698,664 | 10/1987 | Nichols et al. | 348/184 |
| 4,746,994 | 5/1988 | Ettlinger | 360/13 |
| 4,858,011 | 8/1989 | Jackson et al. | 348/705 |
| 4,866,542 | 9/1989 | Shimada et al. | 386/69 |
| 4,937,685 | 6/1990 | Barker et al. | 386/52 |
| 4,943,866 | 7/1990 | Barker et al. | 386/52 |
| 4,954,969 | 9/1990 | Tsumura | 345/327 |
| 4,956,725 | 9/1990 | Kozuki et al. | 386/57 |

(List continued on next page.)

FOREIGN PATENT DOCUMENTS

| | | |
|---|---|---|
| 0 113 993 | 7/1984 | European Pat. Off. . |
| 0 268 270 | 11/1987 | European Pat. Off. . |
| 0 390 048 A2 | 3/1990 | European Pat. Off. . |
| 0 438 299 A2 | 1/1991 | European Pat. Off. . |
| 0438 299 | 7/1991 | European Pat. Off. ...... G11B 27/034 |
| 0 526 064 A2 | 7/1992 | European Pat. Off. . |
| 2 235 815 | 3/1991 | United Kingdom . |
| 90/05350 | 5/1990 | WIPO . |

OTHER PUBLICATIONS

Mark Schubin, Videography, "The Rise of Random Access" Aug., 1989, pp. 25–32.

Green, James L., "The Evolution of DVI System Software", Communications of the ACM, vol. 35, No. 1, Jan. 1992, pp. 53–67.

Norton, Mark J., "A Visual EDL System", 134th SMPTE Technical Conference, Toronto, Canada, Nov. 12, 1992.

Advertisement Illustrating the Lightworks Editor.

Kreig, P., "Multimedia–Computer und die Zukunft des Film/Video–schnitts", Fernseh Und Kino Technik, vol. 45, No. 5, 1991, Heidelberg, Germany, XP229093, pp. 252–258.

Rangan, P. et al., "A Window–Based Editor for Digital Video and Audio", IEEE, Jan. 7–10, 1992, pp. 640–648.

Fox, E.A. et al., "Virtual Video Editing in Interactive Multimedia Applications", Communications of the ACM, vol. 32, No. 7, Jul. 1989, pp. 802–810.

*Primary Examiner*—U. Chauhan
*Attorney, Agent, or Firm*—Kristofer E. Elbing

[57] ABSTRACT

Method and apparatus for selecting samples for presentation on an output device, such as a display or speaker, from a sequence of stored media samples, such as audio or video information. Position information is received from a pointing device, such as a mouse, and translated into direction and magnitude information. A second sample is then retrieved based on this position and magnitude information. This method may be used to implement jog or shuttle controls for a media composer, which may be provided with simulated "inertia" for ease of use.

88 Claims, 4 Drawing Sheets

U.S. PATENT DOCUMENTS

| | | | |
|---|---|---|---|
| 4,964,004 | 10/1990 | Barker | 386/52 |
| 4,979,050 | 12/1990 | Westland et al. | 386/52 |
| 4,988,982 | 1/1991 | Rayner et al. | 345/173 |
| 5,077,610 | 12/1991 | Searby et al. | 348/593 |
| 5,101,364 | 3/1992 | Davenport et al. | 395/152 |
| 5,109,482 | 4/1992 | Bohrman | 345/328 |
| 5,111,409 | 5/1992 | Gasper et al. | 345/302 |
| 5,121,470 | 6/1992 | Trautman | 345/440 |
| 5,148,154 | 9/1992 | MacKay et al. | 340/712 |
| 5,189,516 | 2/1993 | Angell et al. | 348/588 |
| 5,191,645 | 3/1993 | Carlucci et al. | 345/328 |
| 5,202,961 | 4/1993 | Mills et al. | 345/328 |
| 5,206,929 | 4/1993 | Langford et al. | 395/159 |
| 5,237,648 | 8/1993 | Mills et al. | 345/433 |
| 5,289,566 | 2/1994 | Walker et al. | 395/132 |
| 5,307,456 | 4/1994 | MacKay | 395/154 |
| 5,339,393 | 8/1994 | Duffy et al. | 345/328 |
| 5,353,391 | 10/1994 | Cohen et al. | 395/125 |
| 5,388,197 | 2/1995 | Rayner | 345/328 |

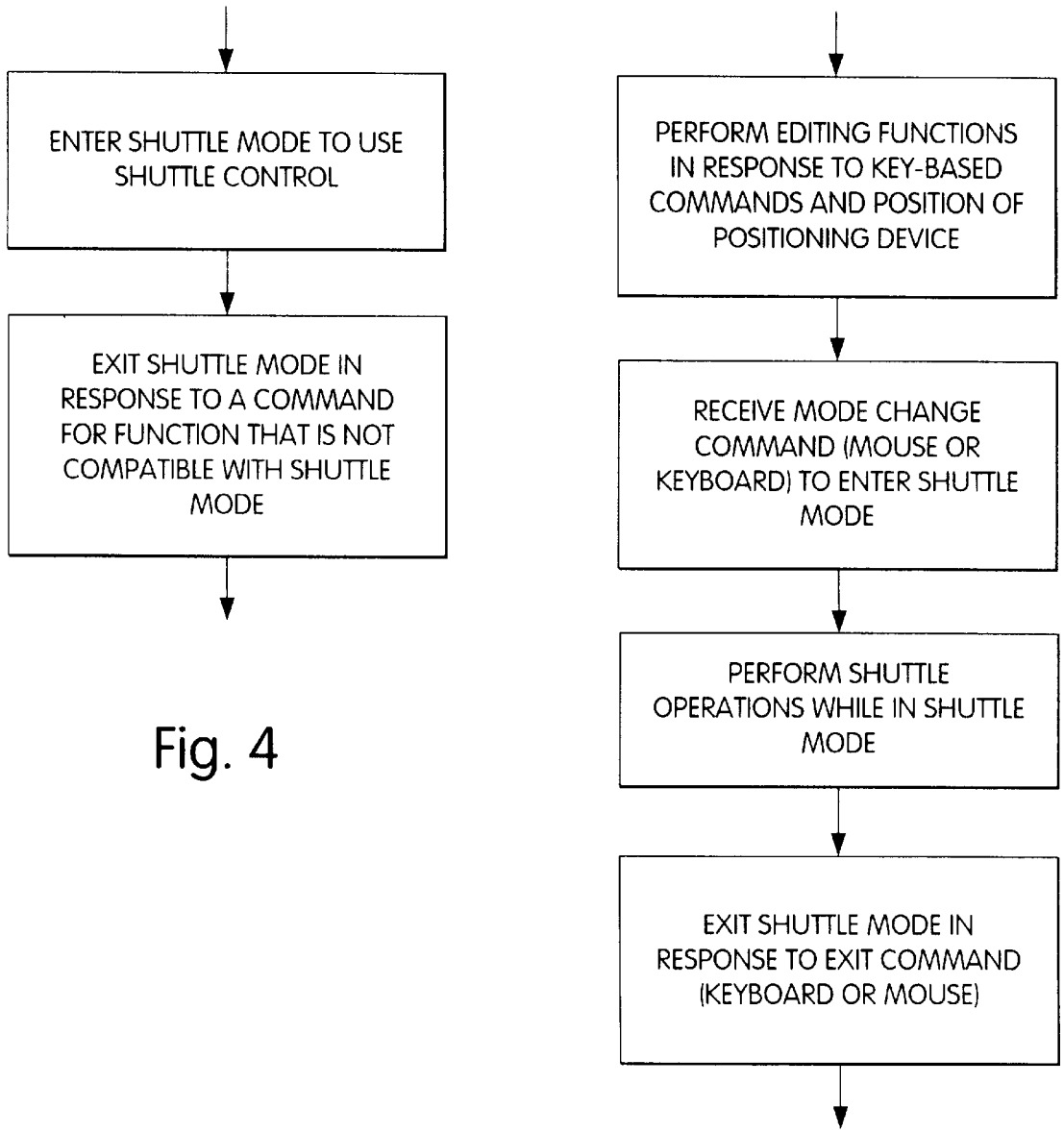

MEDIA COMPOSER INCLUDING POINTER-BASED DISPLAY OF SEQUENTIALLY STORED SAMPLES

CROSS REFERENCE TO RELATED APPLICATION

This application is a continuation of application Ser. No. 08/045,646, filed Apr. 9, 1993 now abandoned, which is a continuation-in-part of application Ser. No. 07/866,829, filed Apr. 10, 1992, entitled "IMPROVED MEDIA COMPOSER" and having issued on Oct. 11, 1994 as U.S. Pat. No. 5,355,450, herein incorporated by reference.

FIELD OF THE INVENTION

The invention relates to the display of sequentially stored samples under the control of a pointer, and more particularly, to the use of a mouse as a jog or shuttle control for computer-based video and audio composition.

BACKGROUND OF THE INVENTION

It is known to provide on a media player, such as a video tape recorder, a jog and/or shuttle knob. A shuttle knob allows the operator of the media player to adjust the speed of the player in either a forward or reverse direction. A jog control allows the user to move in forward and reverse directions through the medium on a still frame by frame basis. Examples of prior art jog and shuttle controls include levers, knobs, concentric knobs, and knobs that change function when pressed upon axially or when another switch is pressed.

A common system is a three-button system, in which the user places three of his or her fingers on three buttons. The outer two fingers control the forward and reverse shuttle operations, which are much like fast forward scan and rewind scan buttons on a video tape recorder, except that multiple presses on the outer buttons in shuttle mode result in proportional increases in shuttling speed. For example, three presses will cause shuttling to take place at triple the shuttling speed. The central button is a stop button, and when it is held down, the outer buttons act as forward and reverse jog controls.

In computer-based media composition systems, a visual representation of a shuttle or jog control may be displayed and manipulated with a mouse. For example, an image of a slider or a film strip may be presented to the user. The user may then click on the slider with the mouse and drag the slider to perform either shuttle or jog operations. For example, the Quantel Harry system, available from Quantel Systems, Inc. of England, uses this type of metaphor. Generally, however, these systems require the user to be watching the screen so that they may locate the mouse pointer in a proper position on the slider.

SUMMARY OF THE INVENTION

In general, the invention features selecting samples for presentation on an output device, such as a display or speaker, from a sequence of stored media samples, such as audio or video information. Position information is received from a pointing device, such as a mouse, and translated into direction and magnitude information. A second sample is then retrieved based on this position and magnitude information. This method may be used to implement jog or shuttle controls for a media composer, which may be provided with simulated "inertia" for ease of use.

A media composer according to the invention has the advantage of convenience and efficiency for the user. The user may perform composition operations using the pointing device and, without removing his or her hand from the pointing device, move to the next location on the medium to be composed. The user may also do so without looking at a control screen at all; he or she need only look at the material to be composed. These capabilities are provided inexpensively in a commonly-available pointing device, which may already be a part of the user's composing system. Also, the added inertia in both jog and shuttle modes, and playback speed limit in shuttle mode may prevent the user from getting lost in the material to be composed.

BRIEF DESCRIPTION OF THE DRAWINGS

For a better understanding of the present invention, together with other and further objects, advantages and capabilities thereof, reference is made to the accompanying drawings, which are incorporated herein by reference and in which:

FIG. 4 is another exemplary flowchart illustrating operation of a workstation portion such as the one shown in FIGS. 1 and 2; and FIG. 5 is a further exemplary flowchart illustrating operation of a workstation portion such as the one shown in FIGS. 1 and 2.

DESCRIPTION OF THE PREFERRED EMBODIMENT

Figure 1:
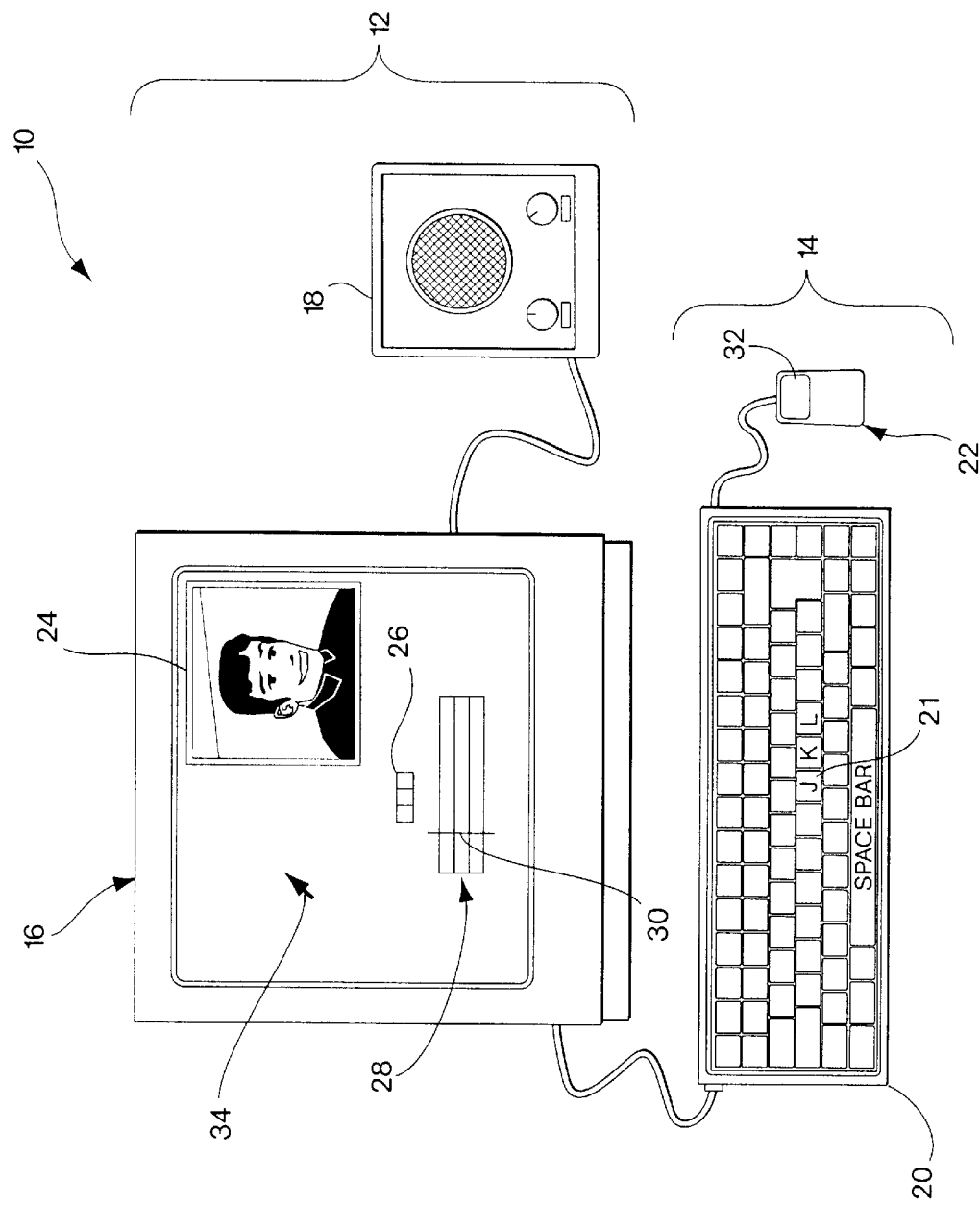
FIG. 1 presents a media composing workstation portion of a media composing system according to the invention.

Referring to FIG. 1, an exemplary media composition workstation according to the invention includes a computer output system 12 and computer input system 14. The output system may include one or more computer monitors 16 and one or more speakers 18. The input device may include a keyboard 20 and a pointing device 22, such as a mouse with one or more buttons 32. The display presented to the user on the monitor may be divided into a window 24 for variable speed playback, on-screen scrub controls 26, a timeline display 28, and a timeline position indicator 30.

Figure 2:
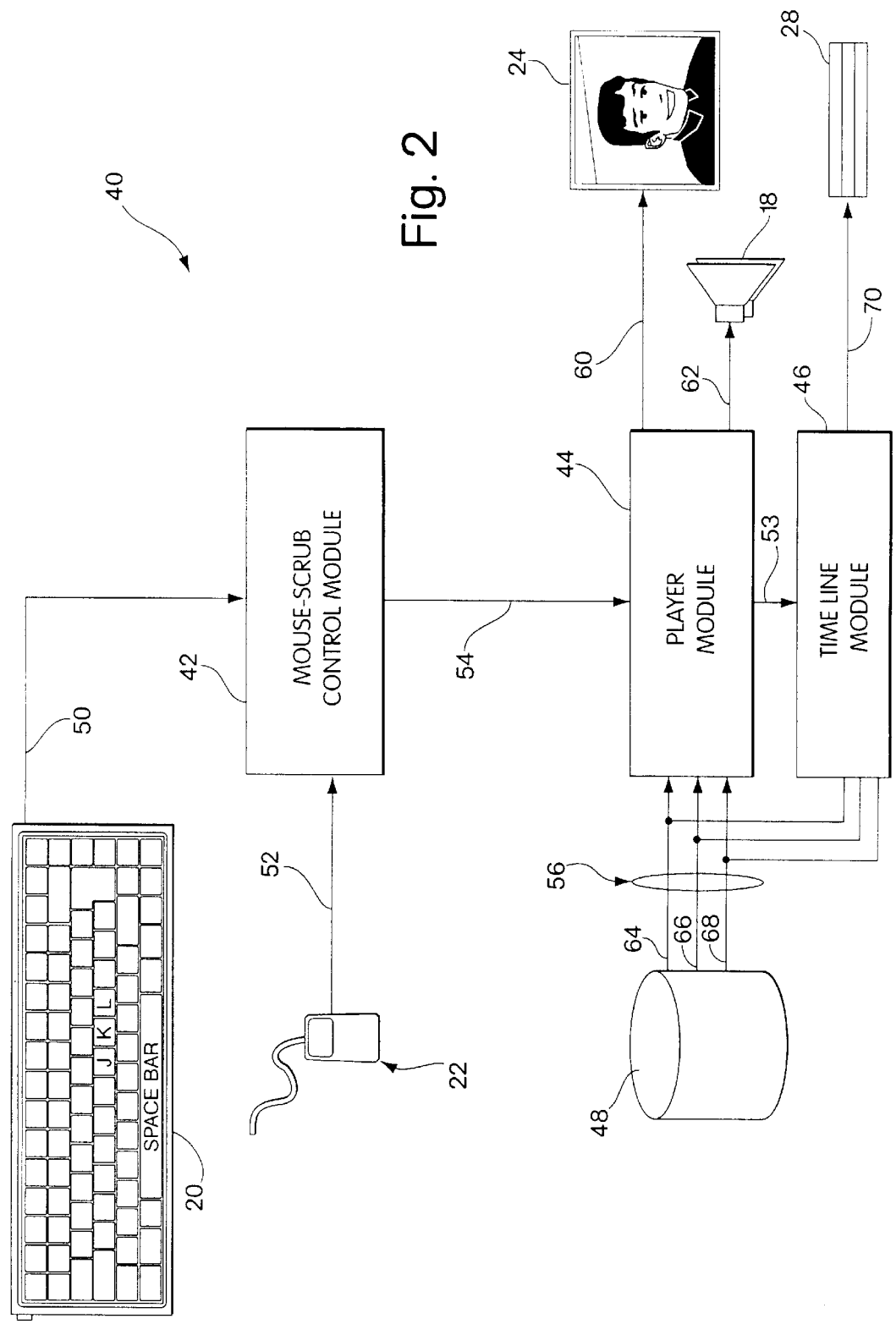
FIG. 2 is a system block diagram of the media composing system of FIG. 1.
Figure 3:
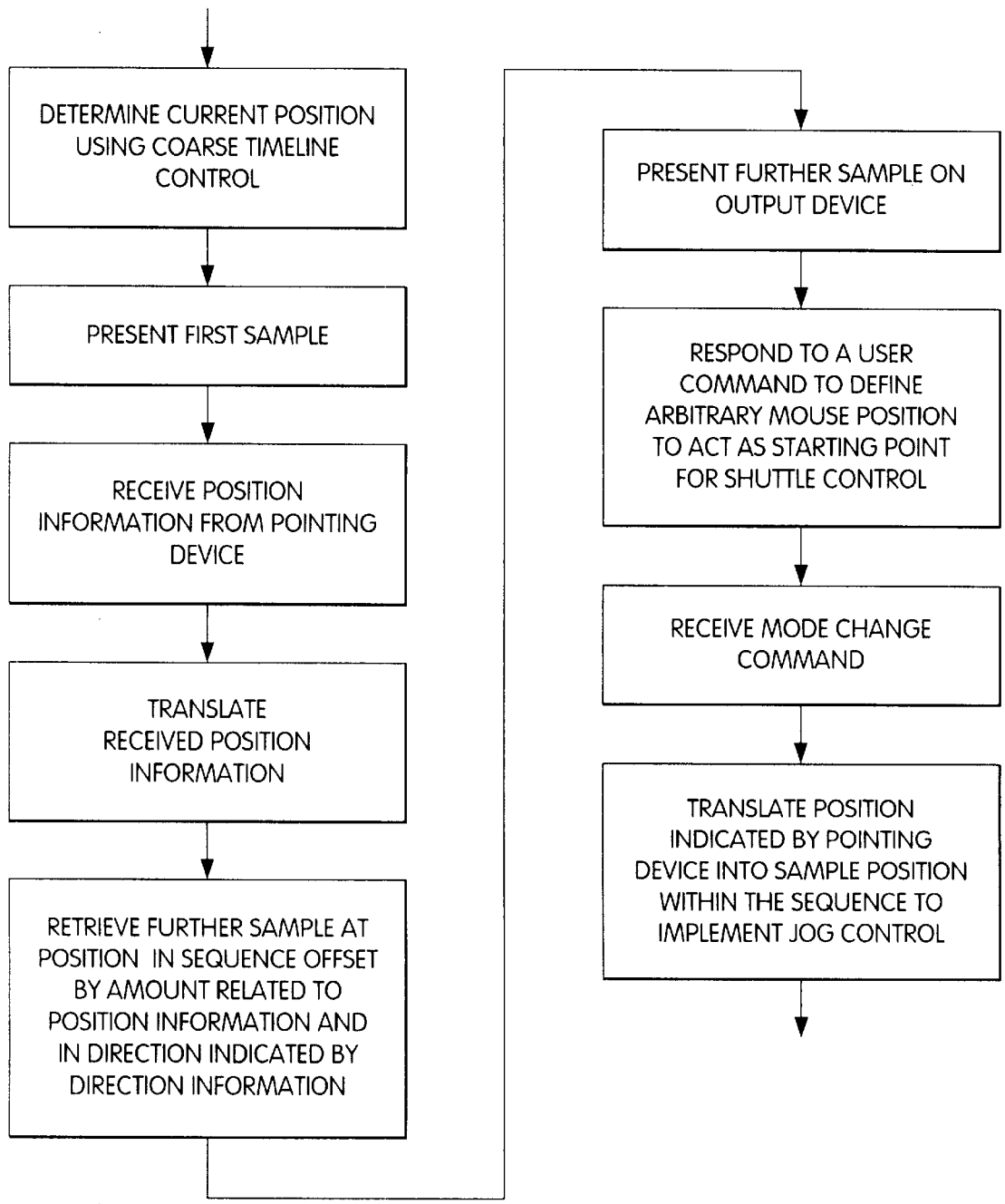
FIG. 3 is an exemplary flowchart illustrating operation of a workstation portion such as the one shown in FIGS. 1 and 2.

Referring to FIG. 2, a media composing system 40 according to the invention may also comprise a mouse/scrub control module 42, a player module 44, a timeline module 46, and storage 48. The mouse/scrub control module is connected to the keyboard via a data path 50 and to the pointing device by another data path 52. The player module 44 is connected to the mouse/scrub control module via a further data path 54.

The player module is also connected to receive information from the storage 48 via a bus 56, which may comprise several data lines 64, 66, 68. These data lines may be dedicated to different synchronized media channels, such as video and audio channels. The bus 56 is further routed to the timeline module 46, which also receives data from the player module via a data path 58. The player module may provide information to the moving picture window 24 via a picture information path 60, and may provide synchronized sound information to the speaker via a sound information data path 62. The timeline module supplies information to the timeline display 28 via a timeline information path 70.

It is observed that the routing of data and information may differ from the block diagram in an actual implementation.

For example, the moving picture window and timeline display may be displayed on the same monitor and therefore share a data line. The pointer data might also be routed through the keyboard on its way to the mouse/scrub module or the keyboard might not be needed at all. Furthermore, the invention herein is applicable to composition operations on sound alone, and therefore the displays may not be necessary. Alternatively, the operations may be performed on images alone, making speakers unnecessary.

The pointing device 22 may be one of several general purpose pointing devices available for computers. It may be a mouse supporting one or more buttons 32, or it may be a trackball, a light pen, a digitizing pad, touch pad, touch screen or the like. These types of pointing devices are commonly used to position a cursor on a screen of a computer system, or to receive position dependent data, such as that generated in a manual digitizing operation.

A system according to the invention may be developed using a variety of types of computer systems. In one embodiment, an Apple Macintosh and the "C" computer language were used, but naturally the invention should not be read to be limited to this particular platform. The mouse/scrub control module, player module, and timeline module may be implemented in software and/or hardware and may or may not be contained within the computer system. A software package entitled "Avid Media Composer", available from Avid Technology, Inc. of Tewksbury, Mass. includes these features. The storage may include a high-speed, high capacity internal magnetic hard disk drive. For further information on computer-based media storage and playback of video and audio information, see Peters et al., "VIDEO AND AUDIO TRANSMISSION SYSTEM AND METHOD", U.S. Pat. No. 5,045,940, issued Sep. 3, 1991, herein incorporated by reference.

Storage 48 contains one or more sequences of image and/or sound samples, and may also contain a sequence of composition information, such as editing and special effect information. The images may be stored in compressed form, allowing more images to be stored in a given amount of space. The sequences of images and sound are generally related in time much like the tracks of a multiple track type recording. For example, the storage may provide multiple logical connections including one or more for picture information 64, one or more for sound information 66, and one or more for composition information 68.

Referring to FIGS. 1 and 2, in composing material, the user interacts with the workstation portion of the system 10. Composition operations may include editing operations, special effects generation, dubbing operations, or the like. The composition to be worked on is displayed in an outline format in the timeline display. This outline format may include waveforms for sound information, or a series of representative pictures for image information such as video or film sequences. If a user desires to perform a composing operation on a particular scene he, or she may move the pointer 34 on the screen using the mouse and click on the portion of the timeline which shows the representative scene indicating the location at which the edit is to be performed. This is a relatively rough operation as computer displays will generally only allow display of a relatively low number of images on a timeline at a meaningful size.

Once the user has located a rough location for the edit using the timeline position indicator, he or she may perform more precise jog and shuttle operations. To do so, the operator may use the pointing device to click on the on-screen controls 26 or may press a key 21 on the keyboard 20. This operation puts the workstation in shuttle mode. In this mode, when the user moves the mouse to the left, the workstation begins moving through the stored sequence of images at a rate determined by the distance through which the user has moved the mouse. This corresponds to a reverse shuttle operation, which may analogized to scan rewinding a video tape at a variable rate, with the rate dependent on the mouse displacement. Conversely, moving the mouse to the right will cause the sequence of images to be moved through in a forward direction in a forward shuttle operation.

The system 40 performs this shuttle operation by first obtaining position information from the pointing device through the data path 52. This operation may be performed by directly accessing the hardware associated with the pointing device, or by retrieving a coordinate stored by the computer's operating system. This mouse position information is then translated by the mouse/scrub control module into direction and magnitude information, which is transferred to the player module.

The magnitude information may be represented by the X-coordinate of the current position of the mouse subtracted from the X-coordinate of the position of the mouse when the mode was entered, with this difference being multiplied by a scaling constant. The sign of this difference may be used as the direction information. The value of the constant will determine how sensitive the shuttle operation will be.

The direction and magnitude information can be transformed in this operation into numerical values which can be directly applied to the player module as commands. The direction information represents the direction of playback for the player module, and the magnitude information represents the speed of playback. These relayed commands directly cause the player module to display the sequences of images and/or sounds on the display at the appropriate rate.

In the shuttle mode, the system limits the maximum forward or reverse speed to three-times the sound speed (the sound speed is the speed at which a video sequence is played where the sound is played at the proper speed). This speed limiting feature prevents the user from getting lost by moving the mouse at a high rate of speed, such as by accidentally knocking the mouse across the desk.

Furthermore, in shuttle mode, "inertia" is added to the operation of the control. Rather than supplying information about mouse position changes directly to the player, changes in mouse position are moderated over a short period. In one embodiment this is done by responding to changes in mouse position by providing a smaller corresponding change in speed to the player module and gradually increasing that change in speed to the full change in speed indicated by the mouse. For example, if the user were to double the distance of the mouse from its starting position, the mouse scrub control module might convey a 50% increase to the player module, followed closely by a 75% increase, and then a 90% increase, and finally a 100% increase. It has been found that this inertia enhances the ease of use and efficiency of use of the apparatus.

In shuttle mode, the system also has a small threshold value below which no shuttle operation takes place. This prevents the player from playing back at extremely slow speeds which are of little use and are sometimes found to be uncomfortable to the user. Values on the order of a 1% threshold have been found to be satisfactory.

The user may also use a jog mode for the workstation. Jog mode is similarly controlled by the position of the mouse, but advances from still frame to still frame within the sequence of images, rather than adjusting the speed of playback of the images. In jog mode, the distance the mouse travels from its starting point relates to the offset within the sequence of frames between the current position and the position to be displayed.

To enter jog mode from shuttle mode, the user may simply press and hold the mouse button 32. This stops the action in the display window and subsequent motion of the mouse will constitute jogging operations. Other methods for entering the jogging mode are possible, such as keyboard keys 21. Similarly, the user may exit the jog mode by one of these methods, or by double clicking on the mouse button 32. Releasing the mouse button while in jog mode will return the user to shuttle mode, and with the current mouse position as the starting position at zero play speed.

In the jog mode, the mouse scrub control module receives position information from the pointing device and translates it into a different kind of direction and magnitude information. The mouse scrub control module constantly monitors the mouse and performs velocity calculations based on the position information of the mouse over time. The resulting velocity information may be supplied directly to the player module, after it is adjusted by a constant. By making the speed of the player proportional to that of the mouse, the player module will track the mouse position.

Inertia may also be added to the jog operations in a manner similar to that disclosed above in connection with the shuttle mode. This is particularly useful in connection with sound information, as it makes sound playback more regular during a jog operation.

It is noted that the timeline moves during both jog and shuttle operation and that this provides feedback to the user in these operations. This feedback enhances the ease of use of the workstation operations and prevents the user from getting lost. Also, the user or system designer may adjust the constants determining the sensitivity of the jog and shuttle controls and the inertia, threshold and maximum speeds in the shuttle mode. This allows the user or designer to customize the "feel" of the workstation.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A method of editing stored video source material using a media composition system that includes a display and a mouse having a mouse button, comprising:

entering a shuttling mode wherein positions of the mouse correspond to different playback speeds for the video source material on the display, responding to movement of the mouse by changing the playback speed of the video source material, the playback speed being related to a distance between a current position of the mouse and a first starting point for the mouse, the first starting point being a mouse position that corresponds to a zero speed, detecting user actuation of the mouse button while in the shuttling mode defining a second starting point corresponding to a cement position of the mouse when the user actuation of the mouse button is detected by the step of detecting, the second starting point being a mouse position different from the first starting point and also corresponding to a zero speed, and responding to movement of the mouse by changing the playback speed of the video source material, the playback speed being related to a distance between a current position of the mouse and the second starting point for the mouse.

2. A method of editing stored video source material using a media composition system that includes a display and a mouse having a mouse button, comprising:

entering a shuttling mode while the mouse is at a first position and a first video frame in the source material is being displayed, the first position and the first video frame defining a first starting point, responding to movement of the mouse by changing the playback speed of the video source material, the playback speed being related to a distance between a current position of the mouse and the first starting point for the mouse, the first starting point corresponding to a zero speed, exiting the shuttling mode, re-entering the shuttling mode while the mouse is at a second position and a second video frame in the source material is being displayed, the second position and the second video frame defining a second starting point different from the first starting point, and responding to movement of the mouse by again changing the playback speed of the video source material, the playback speed being related to a distance between a current position of the mouse and the second starting point for the mouse, the second starting point also corresponding to a zero speed.

3. The method of claim 2 wherein the steps of entering and re-entering take place in response to user actuation of a key on a keyboard.

4. A method of editing stored video source material using a media composition system that includes a display and a mouse, comprising:

entering a shuttling mode wherein positions of the mouse correspond to different playback speeds for the video source material on the display, the positions of the mouse including forward shuttling positions that correspond to forward playback speeds, reverse shuttling positions that correspond to reverse playback speeds, and a starting position that corresponds to a zero speed and is located between the forward and reverse positions, continuously playing back the video source material in a forward direction at a speed that is related to the distance of the mouse from the starting position upon detecting the mouse at forward shuttling positions, while in the shuttling mode, continuously playing back the video source material in a reverse direction at a speed that is related to the distance of the mouse from the starting position upon detecting the mouse at reverse shuttling positions, while in the shuttling mode, and pausing the video source material whenever the mouse is between the forward shuttling positions and the reverse shuttling positions, while in the shuttling mode.

5. The method of claim 4 further including the steps of exiting the shuttling mode and after exiting the shuttling mode, using position information from the mouse to perform other position-sensitive operations.

6. The method of claim 4 further including the step of providing a threshold distance value below which no forward or reverse playing takes place to prevent the video material from being played back at extremely low speeds while in shuttle mode.

7. A method of editing sample source material, comprising:

entering a shuttling mode, while in the shuttling mode, presenting samples from a sequence of media samples at a speed related to a position of a pointing device relative to a pointing device position that acts as first starting point, the first starting point being a mouse position that corresponds to a zero speed, detecting user actuation of a key during the step of presenting, and defining a second starting point different from the first starting point and corresponding to a position of the pointing device when the user actuation was detected by the step of detecting, the second starting point also corresponding to a zero speed.

8. The method of claim 7 wherein the step of presenting employs a mouse as a pointing device and wherein the step of detecting detects actuation of a button on the mouse.

9. The method of claim 7 further including, in response to the step of detecting, entering a jog mode in which further media samples are presented in positions in the sequence of samples that are related to a position of the pointing device relative to the second starting point.

10. The method of claim 9 wherein the step of presenting employs a mouse as a pointing device and wherein the step of detecting detects actuation of a button on the mouse.

11. The method of claim 9 further including the step of remaining in jog mode while the key remains pressed.

12. The method of claim 11 wherein the step of presenting employs a mouse as a pointing device and wherein the step of detecting detects actuation of a button on the mouse.

13. The method of claim 9 further including;

further detecting user actuation of the key while in jog mode, and defining a third starting point different from the first and second starting points and corresponding to a position of the pointing device when the user actuation was detected by the step of further detecting, the third starting point also corresponding to a zero speed, and presenting further media samples from the sequence at a speed related to a position of the pointing device relative to the third starting point.

14. The method of claim 13 wherein the steps of presenting employ a mouse as the pointing device and wherein the steps of detecting detect the actuation of a button on the mouse.

15. The method of claim 7 wherein the step of responding to movement of the pointing device by changing a speed defines forward, reverse and zero speeds that are proportional to the position relative to the first starting point, and wherein the step of responding to movement of the pointing device by again changing the speed defines forward, reverse and zero speeds that are proportional to the position relative to the second starting point.

16. The method of claim 7 further including the step of limiting the playback speed.

17. The method of claim 7 further including the step of moderating the effect of changes in velocity of the pointing device on the playback speed.

18. The method of claim 7 further including, before the step of entering a shuttling mode, determining the current position using a coarse timeline control.

19. The method of claim 7 further including the steps of, after detecting an exit command, using position information from the pointing device to perform other position-sensitive operations.

20. The method of claim 19 wherein the step of detecting an exit command includes detecting a double-click operation of a button on the pointing device.

21. The method of claim 19 wherein the step of detecting an exit command includes detecting keyboard input.

22. The method of claim 19 wherein the step of detecting an exit command includes detecting a command for a function that is not compatible with the shuttling mode.

23. The method of claim 7 further including the step of performing other editing functions while in the shuttling mode.

24. The method of claim 7 wherein the step of presenting is operative display stored images as the samples.

25. The method of claim 7 wherein the step of presenting is operative to play stored audio samples as the samples.

26. A method of editing sampled source material, comprising:

entering a shuttling mode while a pointing device is at a first position and a first media sample in a sequence of media samples is presented, the first position and the first media sample defining a first starting point, responding to movement of the pointing device by changing a speed at which the media samples are presented, the speed being related to a distance between a current position of the pointing device and the first starting point, the first starting point corresponding to a zero speed, exiting the shuttling mode, re-entering the shuttling mode while the pointing device is at a second position and a second media sample in the sequence is presented, the second position and the second media sample defining a second starting point different from the first starting point, and responding to movement of the pointing device by again changing the speed at which the media samples are presented, the speed being related to a distance between a current position of the pointing device and the second starting point, the second starting point also corresponding to a zero speed.

27. The method of claim 26 wherein the step of responding to movement of the pointing device by changing a speed defines a first speed that is proportional to the position relative to the first starting point, and wherein the step of responding to movement of the pointing device by again changing the speed defines a second speed that is proportional to the position relative to the second starting point.

28. The method of claim 26 wherein the steps of responding to movement employ a mouse as the pointing device and wherein the steps of entering and re-entering take place in response to user actuation of a key on a keyboard.

29. The method of claim 26 further including the state of limiting the speed at which media samples are presented.

30. The method of claim 26 further including the step of moderating the effect of changes in velocity of the pointing device on the speed at which media samples are presented.

31. The method of claim 26 further including the step of performing other editing functions while in the shuttling mode.

32. The method of claim 26 wherein the steps of responding operates on stored images as the samples.

33. The method of claim 26 wherein the steps of responding operate on stored audio samples as the samples.

34. A method of editing sample source material, comprising:

entering a shuttling mode wherein positions of a pointing device correspond to different playback speeds for media samples in a sequence of media samples, the positions of the pointing device including forward shuttling positions that correspond to forward playback speeds, reverse shuttling positions that correspond to reverse playback speeds, and a starting position that corresponds to a zero speed and is located between the forward and reverse positions, continuously playing back the media samples in a forward direction at a speed that is related to the distance of the pointing device from the starting position upon detecting the pointing device at forward shuttling positions, while in the shuttling mode, continuously playing back the media samples in a reverse direction at a speed that is related to the distance of the pointing device from the starting position upon detecting the pointing device at reverse shuttling positions, while in the shuttling mode, and pausing the media samples whenever the pointing device is between the forward shuttling positions and the reverse shuttling positions, while in the shuttling mode.

35. The method of claim 34 further including the steps of exiting the shuttling mode and after exiting the shuttling mode, using position information from the pointing device to perform other position-sensitive operations.

36. The method of claim 35 wherein the step of exiting the shuttling mode takes place in response to a double-click operation of a button on the pointing device.

37. The method of claim 35 wherein the step of exiting the shuttling mode takes place in response to keyboard input.

38. The method of claim 35 wherein step of exiting the shuttling mode takes place in response to a command for a function that is not compatible with the shuttling mode.

39. The method of claim 34 wherein the step of entering the shuttling mode takes place in response to keyboard input.

40. The method of claim 34 further including the step of providing a threshold distance value below which no forward or reverse playing takes place to prevent the media samples from being played back at extremely low speeds while in shuttle mode.

41. The method of claim 34 wherein the steps of playing back and pausing employ a mouse as the pointing device.

42. The method of claim 34 wherein the step of entering a shuttling mode defines forward, reverse and zero speeds that are proportional to a current distance of the pointing device from the first starting point.

43. The method of claim 34 further including the step of limiting the playback speed.

44. The method of claim 34 further including the step of moderating the effect of changes in velocity of the pointing device on the playback speed.

45. The method of claim 34 further including, before the step of entering a shuttling mode, determining the current position using a coarse timeline control.

46. The method of claim 34 further including the step of performing other editing functions while in the shuttling mode.

47. The method of claim 34 wherein the steps of playing back are operative to display stored images as the samples.

48. The method of claim 34 wherein the step of playing back are operative to play stored audio samples as the samples.

49. A media editing system, comprising:
a pointing device,
means for, while in a shuttling mode, presenting samples from a sequence of media samples at a speed related to a position of the pointing device relative to a first starting point, the first starting point being a mouse position that corresponds to a zero speed,
means for detecting user actuation of a key during the presentation of samples, and
means for defining a second starting point different from the first starting point and corresponding to a position of the pointing device when the user actuation is detected by the means for detecting, the second starting point also corresponding to a zero speed.

50. The media editing system of claim 49 wherein the pointing device is a mouse and wherein the means for detecting is responsive to a button on the mouse.

51. The media editing system of claim 49 further including means responsive to the means for detecting, for entering a jog mode in which further media samples are presented in positions in the sequence of samples that are related to a position of the pointing device relative to the second starting point.

52. The media editing system of claim 51 wherein the pointing device is a mouse and wherein the means for detecting is responsive to a button on the mouse.

53. The media editing system of claim 51 wherein the means for entering a jog mode is operative to cause the media editing system to remain in jog mode while the key remains pressed.

54. The media editing system of claim 53 wherein the pointing device is a mouse and wherein the means for detecting is responsive to a button on the mouse.

55. The media editing system of claim 49 further including means for presenting further media samples from the sequence at a speed related to a position of the pointing device relative to the second starting point.

56. The media editing system of claim 49 further including a coarse timeline control.

57. The media editing system of claim 49 further including means for, after detecting an exit command, using position information from the pointing device to perform other position-sensitive operations.

58. The media editing system of claim 49 wherein the system is operative to detect a double-click operation of a button on the pointing device as an exit command.

59. The media editing system of claim 49 wherein the system is operative to detect keyboard input as an exit command.

60. The media editing system of claim 49 wherein the system is operative to treat a command for a function that is not compatible with the shuttling mode as an exit command.

61. The media editing system of claim 49 further including means for performing other editing functions while in the shuttling mode.

62. The media editing system of claim 49 further including means for limiting the playback speed.

63. The media editing system of claim 49 further including means for moderating the effect of changes in velocity of the pointing device on the playback speed.

64. The media editing system of claim 49 further including a visual display and wherein the means for presenting is operative to display stored images as the samples.

65. The media editing system of claim 49 further including an audio device and wherein the means for presenting is operative to play stored audio samples as the samples.

66. A media editing system comprising:
a pointing device,
means for enter a shuttling mode while the pointing device is at a first position and a first media sample in a sequence of media samples is presented, the first position and the first media sample defining a first starting point,
means for responding to movement of the pointing device by changing a speed at which the media samples are presented, the speed being related to a distance between a current position of the pointing device and the first starting point, the first starting point corresponding to a zero speed, means for exiting the shuttling mode, means for re-entering the shuttling mode while the pointing device is at a second position and a second media sample in the sequence is presented, the second position and the second media sample defining a second starting point different from the first starting point, and means for responding to movement of the pointing device by again changing the speed at which the media samples are presented, the speed being related to a distance between a current position of the pointing device and the second starting point, the second starting point also corresponding to a zero speed.

67. The media editing system of claim 66 wherein the pointing device is a mouse and wherein the means for entering and re-entering are responsive to user actuation of a key on a keyboard.

68. The media editing system of claim 66 further including means for limiting the speed at which the media samples are presented.

69. The media editing system of claim 66 further including means for moderating the effect of changes in velocity of the pointing device on the speed at which the media samples are presented.

70. The media editing system of claim 66 further including means for performing other editing functions while in the shuttling mode.

71. The media editing system of claim 66 wherein the means for responding to movement of the pointing device by changing a speed is operative to define a first speed that is proportional to the position relative to the first starting point, and wherein the means for responding to movement of the pointing device by again changing the speed is operative to define a second speed that is proportional to the position relative to the second starting point.

72. The media editing system of claim 66 further including a visual display and wherein the means for presenting is operative to display stored images as the samples.

73. The media editing system of claim 66 further including an audio device and wherein the means for presenting is operative to play stored audio samples as the samples.

74. A method of editing sample source material, comprising:

means for entering a shuttling mode wherein positions of a pointing device correspond to different playback speeds for media samples in a sequence of media samples, the positions of the pointing device including forward shuttling positions that correspond to forward playback speeds, reverse shuttling positions that correspond to reverse playback speeds, and a starting position that corresponds to a zero speed and is located between the forward and reverse positions, means for continuously playing back the media samples in a forward direction at a speed that is related to the distance of the pointing device from the starting position upon detecting the pointing device at forward shuttling positions, while in the shuttling mode, means for continuously playing back the media samples in a reverse direction at a speed that is related to the distance of the pointing device from the starting position upon detecting the pointing device at reverse shuttling positions, while in the shuttling mode, and means for pausing the media samples whenever the pointing device is between the forward shuttling positions and the reverse shuttling positions, while in the shuttling mode.

75. The media editing system of claim 74 further including means operative to exit the shuttling mode and after exiting the shuttling mode, using position information from the pointing device to perform other position-sensitive operations.

76. The media editing system of claim 75 wherein the means operative to exit the shuttling mode is responsive to a double-click operation of a button on the pointing device.

77. The media editing system of claim 75 wherein the means operative to exit the shuttling mode is responsive to keyboard input.

78. The media editing system of claim 75 wherein the means operative to exit the shuttling mode is responsive to a function that is not compatible with the shuttling mode.

79. The media editing system of claim 75 wherein the means for entering the shuttling mode is responsive to keyboard input.

80. The media editing system of claim 74 further including means operative to provide a threshold distance value below which no forward or reverse playing takes place to prevent the media samples from being played back at extremely low speeds while in shuttle mode.

81. The media editing system of claim 74 wherein the pointing device is a mouse.

82. The media editing system of claim 74 wherein the means for a entering a shuttling mode defines forward, reverse and zero speeds that are proportional to a current distance of the pointing device from the first starting point.

83. The media editing system of claim 74 further including means for limiting the playback speed.

84. The media editing system of claim 74 further including means for moderating the effect of changes in velocity of the pointing device on the playback speed.

85. The media editing system of claim 74 further including a coarse timeline control.

86. The media editing system of claim 74 further including means for performing other editing functions while in the shuttling mode.

87. The media editing system of claim 74 wherein the means for playing back are operative to display stored images as the samples.

88. The media editing system of claim 74 wherein means for playing back are operative to play stored audio samples as the samples.

* * * * *

UNITED STATES PATENT AND TRADEMARK OFFICE
CERTIFICATE OF CORRECTION

PATENT NO : 6,018,337

DATED : January 25, 2000

INVENTOR(S) : Eric C. Peters et al.

It is certified that error appears in the above-identified patent and that said Letters Patent is hereby corrected as shown below:

Column 1, where the title should read --Media Editing System Including Pointer-Based Display of Sequentially Stored Samples--;

Column 5, line 60, where "cement" should read --current--;

Column 10, line 5, where "enter" should read --entering--;

Signed and Sealed this

Twenty-seventh Day of March, 2001

Attest:

NICHOLAS P. GODICI

Attesting Officer

*Acting Director of the United States Patent and Trademark Office*